US009022370B2

(12) United States Patent
Swan et al.

(10) Patent No.: US 9,022,370 B2
(45) Date of Patent: May 5, 2015

(54) WORKPIECE SUPPORT

(75) Inventors: Daniel J. A. Swan, Derby (GB); Paul I. Rayment, Derby (GB); Robin C. Kennea, Nottingham (GB)

(73) Assignee: Rolls-Royce PLC, London (GB)

( * ) Notice: Subject to any disclaimer, the term of this patent is extended or adjusted under 35 U.S.C. 154(b) by 709 days.

(21) Appl. No.: 13/370,908

(22) Filed: Feb. 10, 2012

(65) Prior Publication Data

US 2012/0223467 A1    Sep. 6, 2012

(30) Foreign Application Priority Data

Mar. 1, 2011    (GB) .................................. 1103454.3

(51) Int. Cl.
| | |
|---|---|
| *B25B 1/20* | (2006.01) |
| *F01D 25/28* | (2006.01) |
| *B23Q 1/25* | (2006.01) |
| *B27F 7/15* | (2006.01) |
| *B23Q 16/00* | (2006.01) |
| *B23Q 1/26* | (2006.01) |
| *B25B 11/02* | (2006.01) |
| *B64F 5/00* | (2006.01) |
| *F16M 11/04* | (2006.01) |

(52) U.S. Cl.
CPC .............. *F01D 25/285* (2013.01); *B23Q 1/25* (2013.01); *B27F 7/155* (2013.01); *B23Q 16/001* (2013.01); *B23Q 1/267* (2013.01); *B25B 11/02* (2013.01); *B64F 5/0036* (2013.01); *F16M 11/041* (2013.01)

(58) Field of Classification Search
USPC ........................................................ 269/37
See application file for complete search history.

(56) References Cited

U.S. PATENT DOCUMENTS

| | | | | | |
|---|---|---|---|---|---|
| 490,519 | A | * | 1/1893 | Wayland | 269/145 |
| 1,323,127 | A | * | 11/1919 | Treuthardt | 269/45 |
| 1,416,760 | A | | 5/1922 | Steenstrup | |
| 1,781,651 | A | * | 11/1930 | Burkley et al. | 269/37 |
| 3,268,093 | A | | 8/1966 | Keiter | |
| 4,429,861 | A | * | 2/1984 | Range | 269/40 |
| 4,539,738 | A | * | 9/1985 | Antol et al. | 29/467 |

(Continued)

FOREIGN PATENT DOCUMENTS

| | | |
|---|---|---|
| BE | 661 260 | 7/1965 |
| CH | 678 829 A5 | 11/1991 |

(Continued)

OTHER PUBLICATIONS

Jun. 27, 2011 British Search Report issued in Patent Application No. GB1103454.3.

(Continued)

*Primary Examiner* — Lee D Wilson
*Assistant Examiner* — Alvin Grant
(74) *Attorney, Agent, or Firm* — Oliff PLC

(57) ABSTRACT

A workpiece support, including: first and second arms pivotably connected to first and second support members respectively, the first and second support members being spaced apart, each arm including first and second receiving members for receiving the workpiece, the first and second receiving members being provided at first and second ends of each arm respectively, wherein each arm is pivotably connected to the respective first and second support members at a point between the first and second ends of each arm, such that a workpiece may be supported by the first and second receiving members of the first arm and the first and second receiving members of the second arm.

15 Claims, 5 Drawing Sheets

(a)

(56) References Cited

U.S. PATENT DOCUMENTS

| | | | |
|---|---|---|---|
| 4,747,588 A | | 5/1988 | Dillhoff |
| 5,494,553 A | * | 2/1996 | Colucci .................. 156/580 |
| 6,142,460 A | * | 11/2000 | Irwin ...................... 269/60 |
| 6,283,361 B1 | * | 9/2001 | Maki et al. ............... 228/212 |
| 6,439,449 B1 | * | 8/2002 | Gelfman .................. 228/121 |
| 6,874,737 B1 | * | 4/2005 | Madelone ................ 248/127 |
| 7,331,094 B2 | * | 2/2008 | Berninger ............... 29/407.05 |
| 8,146,222 B2 | * | 4/2012 | Frauen et al. ............ 29/281.1 |
| 2010/0327507 A1 | | 12/2010 | Clark et al. |
| 2011/0204006 A1 | | 8/2011 | Jacobs et al. |
| 2013/0026691 A1 | * | 1/2013 | Cahill et al. ............... 269/37 |

FOREIGN PATENT DOCUMENTS

| | | |
|---|---|---|
| EP | 0 013 772 A1 | 8/1980 |
| EP | 1 052 377 A2 | 11/2000 |
| FR | 2 237 060 A1 | 2/1975 |
| GB | 2 045 357 A | 10/1980 |
| GB | 2 226 522 A | 7/1990 |
| GB | 2 394 940 A | 5/2004 |
| GB | 2 460 419 A | 12/2009 |

OTHER PUBLICATIONS

Jun. 12, 2012 European Search Report issued in European Patent Application No. 12154841.

* cited by examiner

WORKPIECE SUPPORT

This invention claims the benefit of UK Patent Application No. 1103454.3, filed on 1 Mar. 2011, which is hereby incorporated herein in its entirety.

The present disclosure relates to a workpiece support and particularly but not exclusively relates to a workpiece support for a gas turbine engine.

Engines, in particular gas turbine engines, may be supported during assembly, disassembly and maintenance of the constituent components. A previously-proposed stand 10 supporting a gas turbine engine 20 is shown in FIG. 1(a) with an enlarged view of the stand 10 shown in FIG. 1(b). As depicted, there may be four stands 10, one in each corner of the gas turbine engine 20.

Referring to FIG. 1(b), each stand 10 may comprise a vertical slot 12 for receiving a corresponding pin 22 provided on the gas turbine engine 20. The pin 22 may be provided on a bracket 24, which may in turn be fastened to the engine 20. The engine 20 is lowered into the stands 10 so that the pins 22 align and engage with the slots 12 in the stands.

Currently, the stands 10 and associated brackets 24 are unique to each engine 20. Accordingly, the prior art requires bespoke brackets 24 and/or stands 10 depending on the engine type. Therefore the stands and/or brackets must be changed if a different engine is to be worked on. Alternatively, only particular engines may be worked on in particular areas of the workshop. However, this does not facilitate modern manufacturing processes, which require flexibility in the use of manufacturing space and time.

Furthermore, the previously-proposed stands 10 require brackets 24 to be fastened to the engine 20. Not only does this take time, but the brackets 24 also increase the total engine weight, which is disadvantageous, particularly in the case of a jet engine.

The present disclosure therefore seeks to address these issues.

According to a first aspect of the present invention there is provided a workpiece support comprising: first and second arms pivotably connected to first and second support members respectively, the first and second support members being spaced apart, each arm comprising first and second receiving members for receiving a workpiece, the first and second receiving members being provided at first and second ends of each arm respectively, wherein each arm is pivotably connected to the respective first and second support members at a point between the first and second ends of each arm, such that the workpiece may be supported by the first and second receiving members of the first arm and the first and second receiving members of the second arm.

A point about which the arm pivots may be spaced apart from a line joining the first and second receiving members. One or both of the first and second arms may comprise first and second portions. The first portion may comprise the first end of the arm and the second portion may comprise the second end of the arm. The first and second portions may be angled with respect to one another. For example, the first and second portions of the arm may not be parallel and they may be oblique. Alternatively, the first and second portions of the arm may be parallel. The angle between the first and second portions may be adjustable but locked in a set orientation during operation of the stand.

The first and second arms and/or first and second receiving members may be removable from the workpiece support. The first and second arms and/or first and second receiving members may be interchangeable with alternative or replacement first and second arms and/or first and second receiving members.

The first and second arms and/or first and second receiving members may be adjustable in size and/or shape, e.g. to accommodate different workpieces. For example, the first and second arms may be adjustable in length. The first and second receiving members may be shaped to correspond with portions of the workpiece.

The workpiece support may further comprise further arms with further first and second receiving members. The further arms may be arranged such that there are arms either side of the support members.

A plurality of receiving members may be provided on each portion of the arm.

The first and/or second arms may be biased, e.g. resiliently, into a receiving position, e.g. in which the arms are ready to receive the workpiece. The first and/or second arms may be biased into the receiving position by a resilient means, e.g. a spring, hydraulic ram arrangement or any other resilient means. The first and/or second arms may be biased into the receiving position by virtue of gravity, e.g. by the position of the arm pivot point with respect to the centre of gravity of the arm.

The first and/or second receiving members may comprise securing means for securing the receiving members to the workpiece. For example, the first and/or second receiving members may be mechanically fastened to the workpiece, e.g. by virtue of a screw thread or any other securing means.

The first and/or second receiving members may be fixed, e.g. not movable, relative to the respective first and/or second arms. Alternatively, the first and/or second receiving members may be movable, e.g. pivotable, relative to the respective first and/or second arms.

The workplace support may further comprise one or more resilient means arranged to permit relative movement of the first and second receiving members. The resilient means may comprise a spring, an elastomeric, e.g. rubber, member, an elasto-hydrodynamic system or any other resilient means. The resilient means may reduce the risk of damaging the workpiece when positioning it on the workplace support and/or increase the self adjustability of the system.

One or both of the first and second arms may comprise three or more receiving members. The third and any further receiving members may be provided at a point intermediate of the first and second ends of the first and second arms.

The workpiece support may be adapted to support workpieces of varying shapes and/or sizes. The workpiece support may be adapted to support an engine, for example a gas turbine engine.

One or more of: the first and second support members, the first and second arms and the first and second receiving members may be electrically earthed.

For a better understanding of the present disclosure, and to show more clearly how it may be carried into effect, reference will now be made, by way of example, to the accompanying drawings, in which:—

FIGS. 1(a) and 1(b) show a perspective view of a previously-proposed engine support with FIG. 1(b) showing an enlarged view of the support shown in FIG. 1(a);

FIGS. 2(a) and 2(b) show a side view of a workpiece support according to an example of the present disclosure with FIG. 2(a) showing the workpiece being lowered into place and FIG. 2(b) shows the workpiece in place;

Figure 9:
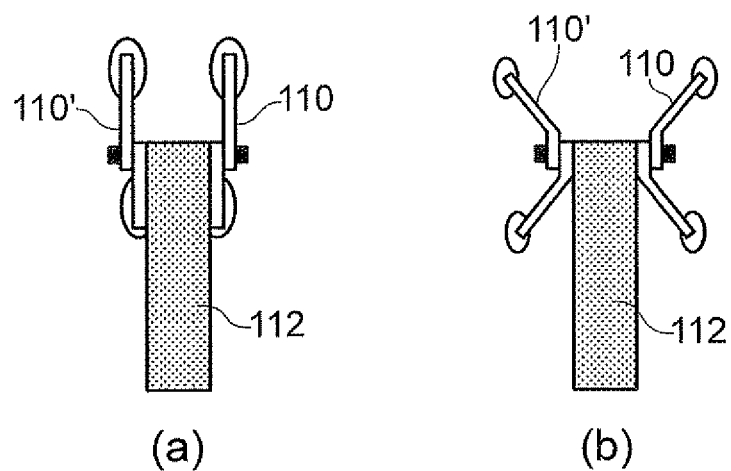
Figure 10:
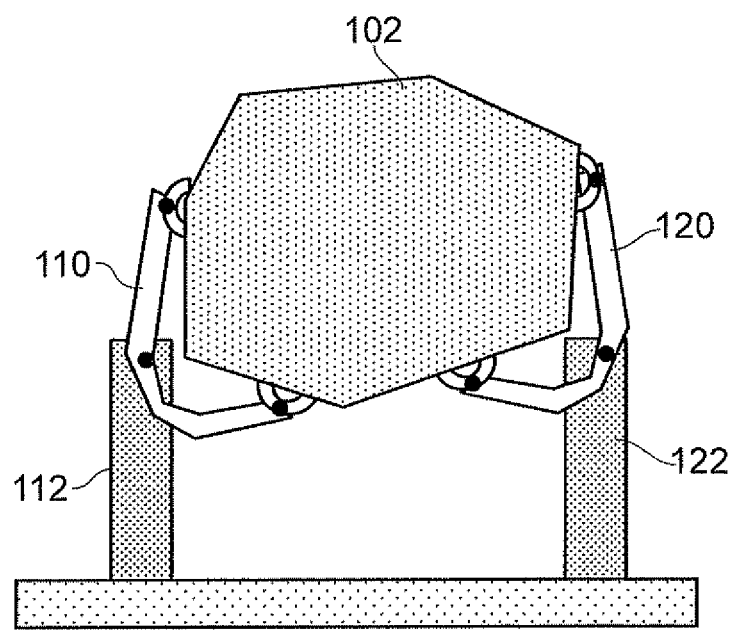

FIGS. 8(a) and 8(b) show workpiece supports according to examples of the present disclosure with FIG. 8(b) showing a workpiece support biased into a receiving position;

FIGS. 9(a) and 9(b) show two further workpiece supports each comprising arms either side of the support; and FIG. 10 shows a side view of a workpiece support with arms tailored to the workpiece according to a further example of the present disclosure.

Figure 1A:
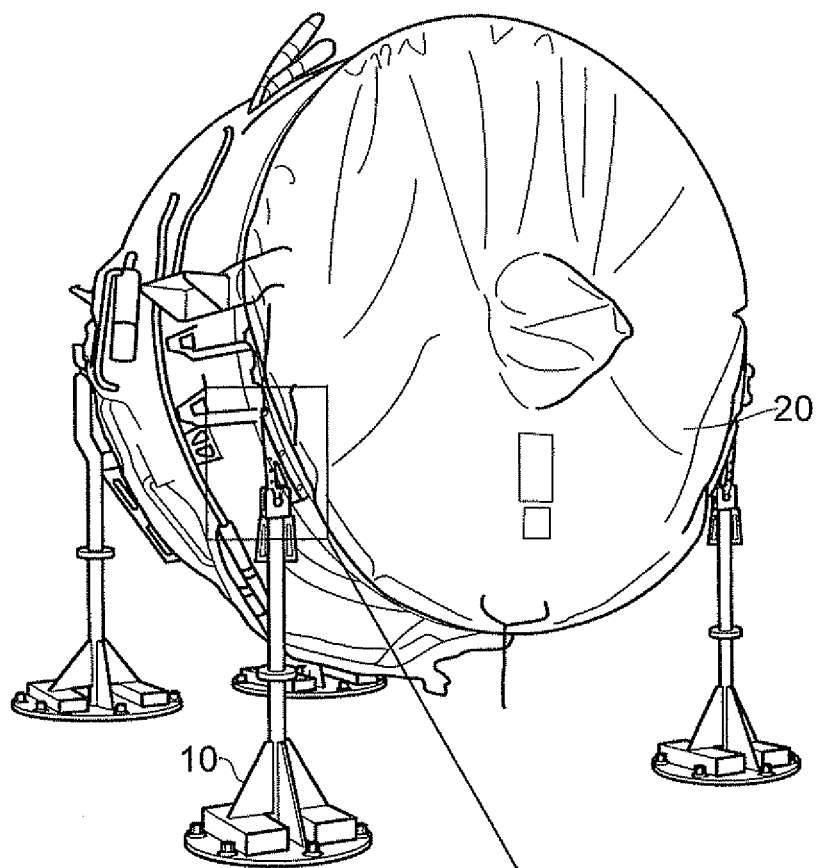
Figure 1B:
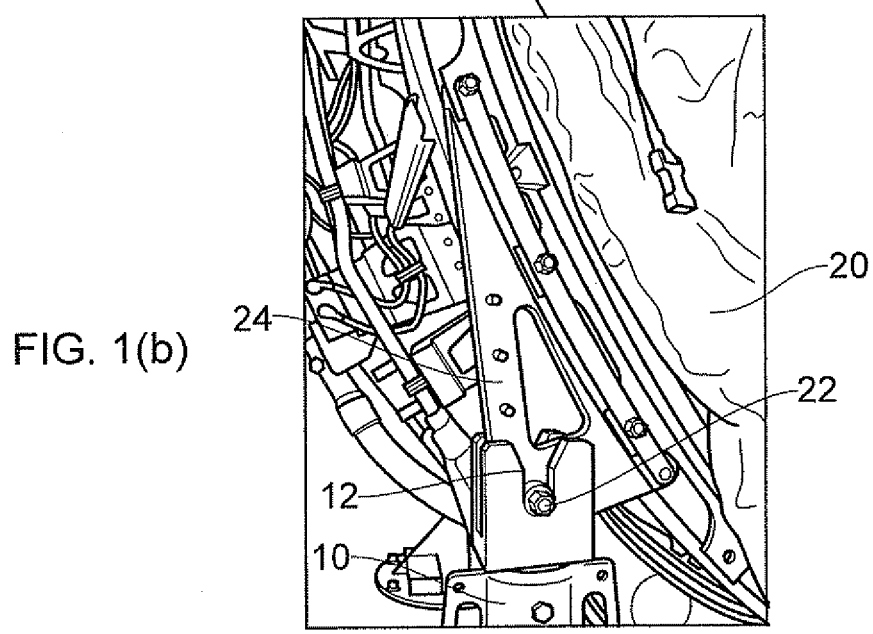
Figure 2A:
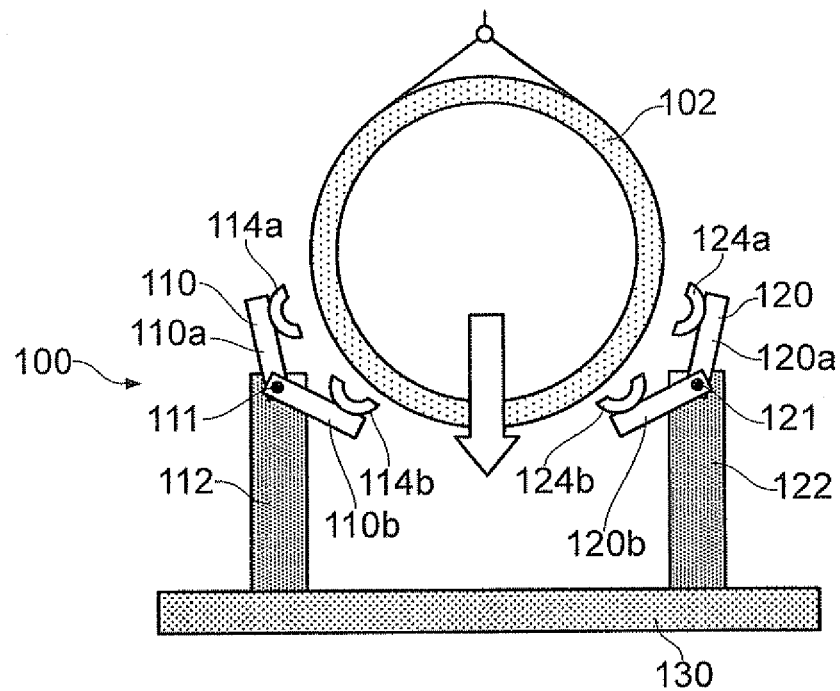
Figure 2B:
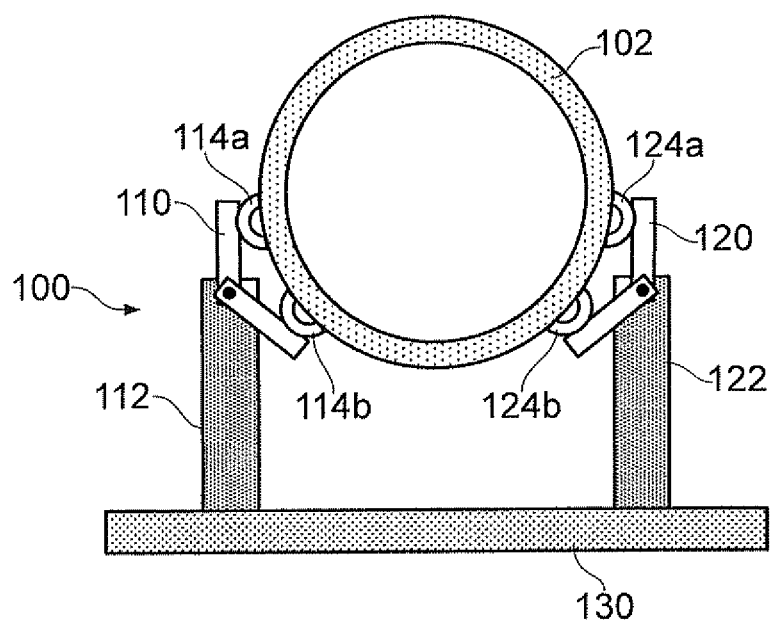

With reference to FIGS. 2(a) and 2(b), a workpiece support 100, according to an example of the present disclosure, may support a load, e.g. workpiece 102, for example, during assembly, disassembly or repair of the workpiece. The workpiece 102 may comprise an engine, in particular a gas turbine engine, or any other load requiring support.

The workpiece support 100 may comprise first and second arms 110, 120 pivotably connected to first and second support members 112, 122 respectively. The first and second support members 112, 122 may comprise stands, pedestals or any other type of support member. The first and second support members 112, 122 may be laterally spaced apart. Although not shown, the support members 112, 122 may be braced to improve their stability. The support members 112, 122 may be fixed with respect to one another, e.g. they may both be fixed to the workshop floor 130 or they may be provided on a separate stand or base. The support members 112, 122 may also be earthed to ensure that the workpiece does not become electrically charged.

The first arm 110 may comprise first and second receiving members 114a, 114b, e.g. support pads, for receiving the workpiece 102. The second arm 120 may also comprise first and second receiving members 124a, 124b, e.g. support pads, for receiving the workpiece 102. The first and second receiving members 114a, 114b, 124a, 124b may be connected to each other via the respective arm 110, 120 and the first and second receiving members may thus move as a pair.

The first and second receiving members 114a, 114b, 124a, 124b may be shaped and/or sized to correspond with and receive the workpiece 102. The first and second receiving members may also comprise materials suitable to grip and/or conform to the workpiece. For example, the first and second receiving members may be made from a resilient material, e.g. an elastomer such as rubber. Alternatively or additionally, the receiving members 114a, 114b, 124a, 124b may be configured to be mechanically fastened (e.g. by screw thread or similar) to the workpiece 102 in order to further improve the security of the workpiece 102.

The first and second receiving members 114a, 114b, 124a, 124b may be provided at first and second ends of each arm respectively. For example, the first receiving members 114a, 124a may be provided at first, e.g. upper, ends of the first and second arms 110, 120 and the second receiving members 114b, 124b may be provided at second, e.g. lower, ends of the first and second arms 110, 120.

Each arm 110, 120 may be pivotably connected to the respective first and second support members 112, 122 at a pivot point 111, 121 between the first and second ends of each arm. The pivot point 111, 121 may be laterally offset from a line joining the first and second receiving members provided on a particular arm. For example, in the case of the first arm 110, the first arm may comprise first and second portions 110a, 110b and the first and second portions may be angled with respect to one another. The first portion 110a may comprise the first end of the arm and the second portion 110b may comprise the second end of the arm. Likewise, the second arm 120 may comprise first and second portions 120a, 120b and the first and second portions may be angled with respect to one another. The first portion 120a may comprise the first end of the arm and the second portion 120b may comprise the second end of the arm.

As depicted in FIG. 2(b), the workpiece 102 may be supported between the first and second receiving members 114a, 114b, of the first arm 110 and the first and second receiving members 124a, 124b of the second arm 120. As the workpiece is lowered onto the workpiece support 100, the orientation of the first and second arms 110, 120 may adjust to support the workpiece. In other words, the first and second arms 110, 120 and their corresponding receiving members may self centre with respect to the workpiece. In this way the workpiece support 100 of the present disclosure may accommodate workpieces having a range of shapes and sizes. Furthermore, the force imparted on the lower receiving members 114b, 124b may pivot the upper receiving members 114a, 124a closer towards the workpiece thereby securely clamping the workpiece 102 in place.

The remaining Figures show further optional features for the workpiece support 100. For the sake of convenience the remaining Figures and associated description may refer to only one of the arms. However, the arrangements described below may equally or alternatively be applied to the other arm.

Figure 3:
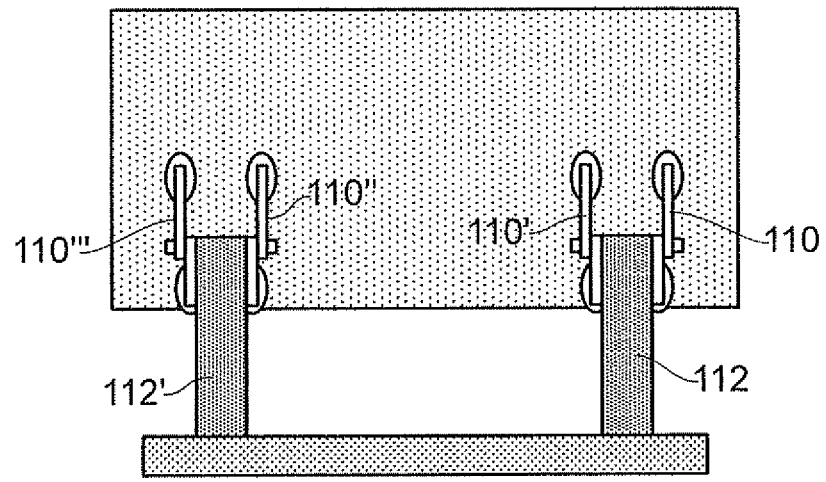
FIG. 3 shows a further side view of a workpiece support according to an example of the present disclosure.

With reference to FIG. 3, the workpiece support 100 may further comprise a plurality of longitudinally spaced apart arms 110, 110', 110", 110'". For example, additional arms 110' may be connected to the same support member 112 and/or additional arms 110", 110'" may be connected to a further support member 112' longitudinally spaced apart from support member 112. In the case of the arms being connected to the same support member 112, 112', the arms may be free to move independently of each other. The arms may be provided either side of the same support member.

Figure 4:
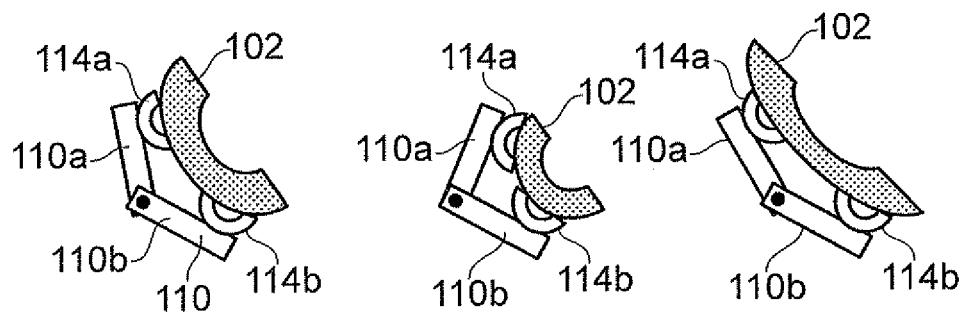
FIG. 4 shows a side view of arms and receiving members according to examples of the present disclosure.

With reference to FIG. 4 the relative position of the receiving members 114a, 114b with respect to each other may be adjustable. As shown in FIG. 4, the position of the receiving members 114a, 114b may be tailored to the size, e.g. diameter, and/or shape of the workpiece 102 by altering the angle between the portions 110a, 110b of the arm 110 before the portions 110a, 110b of the arm 110 are locked together in their determined angle, e.g. by splines or any other mechanical locking means before mounting of the article in the workpiece support. Alternatively, the first and second portions of the arms may be unitary, i.e. they may be formed from a single piece of material, or they may be permanently locked together.

Figure 5:
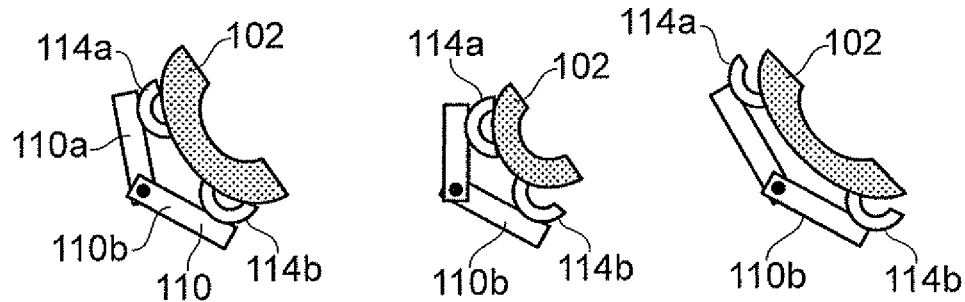
FIG. 5 shows a side view of arms and receiving members according to further examples of the present disclosure.

With reference to FIG. 5 the receiving members 114a, 114b and/or arm 110 may be adjustable in size and/or shape. For example, the receiving members 114a, 114b and/or arm 110 may be tailored to the size and/or shape of the workpiece 102 before the arms are fixed in their determined arrangement before the workpiece is mounted. The receiving members 114a, 114b may be shaped to mate with specially designed or existing features in the workpiece to improve the security of the workpiece. Likewise, the arm 110 may be sized to correspond to the shape and/or size of the workpiece, for example the arm 110 may be extendable in length. Furthermore, the receiving members 114a, 114b and/or arm 110 may be removable. For example, the receiving members 114a, 114b and/or arm 110 may be interchanged with components of a different shape and/or size, e.g. for receiving a workpiece with a different geometry and/or size. Any and all adjustments between the arms are made before the arms are fixed in their determined position and the workpiece is mounted thereon.

Figure 6:
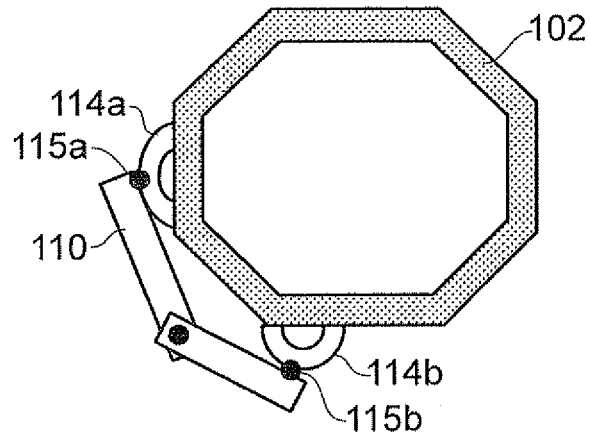
FIG. 6 shows a side view of part of a self adjusting workpiece support according to a further example of the present disclosure.

With reference to FIG. 6, the receiving members 114a, 114b may be configured to move with respect to the arm 110. For example, the receiving members 114a, 114b may pivot with respect to the arm 110 and the receiving members 114a, 114b may pivot in more than one plane with respect to the arm 110. By way of example, the receiving members 114a, 114b may pivot about ball joints 115a, 115b provided between the arm 110 and each of the receiving members. The receiving members 114a, 114b may thus self locate with respect to the workpiece 102.

Figure 7:
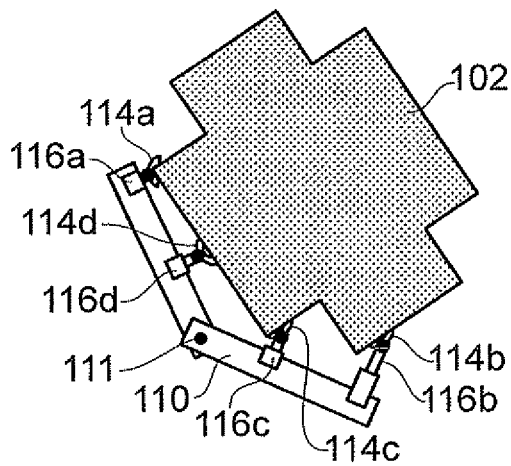
FIG. 7 shows a side view of part of a workpiece support comprising damping means according to a further example of the present disclosure.

With reference to FIG. 7 the workpiece support 100 may further comprise one or more additional receiving members 114c, 114d. These additional receiving members 114c, 114d may be disposed at points between the pivot point 111 and either of the receiving members 114a, 114b. The additional receiving members 114c, 114d may better distribute the load from the workpiece 102 to the arm 110.

Referring still to FIG. 7, one or more resilient means 116a, 116b, 116c, 116d may be incorporated into the workpiece support. The resilient means 116a, 116b, 116c, 116d may comprise one or more of a dashpot, a spring, an elastomer, e.g. rubber, an elasto-hydrodynamic system or any other resilient element. The resilient means may be configured to reduce the risk of damaging the workpiece 102 when positioning it on the workpiece support 100 and/or increase the self adjustability of the system. Accordingly, the resilient means may provide an element of damping to the system, e.g. so that the load imparted by the workpiece is gradually transferred to the workpiece support. As depicted in FIG. 7, the resilient means may be provided between one or more of the receiving members 114a, 114b, 114c, 114d and the arm 110.

Figure 8:
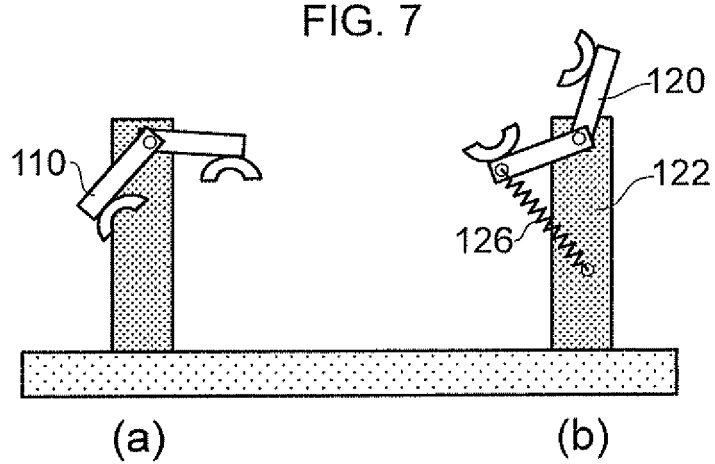

With reference to FIG. 8 the arms of the workpiece support may be biased into a position ready to receive the workpiece. For example, as shown in FIG. 8(b), the second arm 120 may be resiliently biased, e.g. by a spring 126 disposed between the support member 122 and an end of the second arm. The spring shown may be a compressive spring (i.e. a spring acting under compression) connected to the lower end of the arm, however, a tensile spring (i.e. a spring acting under tension) may be connected to the upper end of the arm. The spring 126 ensures that when the workpiece 102 is removed the arm returns to a position ready to receive the next workpiece. By contrast, FIG. 8(a) shows how an unbiased arm 110 may default to a position which is not suitable for receiving the workpiece. However, although not shown in FIG. 8, the first arm 110 may also be biased in the same manner as the second arm 120. In an alternative arrangement, the first and/or second arms may be biased into the receiving position by virtue of gravity, e.g. by the position of the arm pivot point with respect to the centre of gravity of the arm, or by any other biasing means.

With reference to FIGS. 9 and 10, the arms may be configured, e.g. shaped, to distribute the load of the workpiece 102. For example, as depicted in FIG. 9(b), the arms 110, 110' may be shaped, e.g. splayed apart, in the longitudinal plane. This contrasts with the in line arrangement shown in FIG. 9(a). The arms depicted in FIG. 9(b) may better distribute the load, e.g. in the case of a long workpiece or a workpiece with an off-centre centre of gravity. Alternatively or additionally, as shown in FIG. 10, the arms 110, 120 may be shaped in the lateral plane. For example, the arms 110, 120 may be curved or may comprise one or more angled portions and the arms may be tailored to the shape of the workpiece 102.

The workpiece support of the present disclosure improves on the prior art by enabling the supports to be used with a wide range of workpieces, e.g. engines. The present disclosure may be applied to loads of vastly differing shapes, sizes and/or weights.

The workpiece support of the present disclosure also removes the requirement for brackets fastened to the engine. Furthermore, there is an opportunity to reduce the time taken in supporting the engine as the stands and/or engine do not need to be positioned as accurately as required by the prior art. For example, the workpiece support disclosed herein is tolerant to unexpected changes in geometry of the load, e.g. an engine may be damaged in service such that the location points required by the previously-proposed stands are unusable.

This workpiece support of the present disclosure may be used in any application where a load is to be supported. In particular, it may be used where the workpiece is liable to be damaged if its weight is not distributed evenly on supports.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A workpiece support comprising:
   first and second arms pivotably connected to first and second support members respectively, the first and second support members being spaced apart, one or both of the first and second arms comprising first and second portions, the first portion comprising the first end of the arm and the second portion comprising the second end of the arm, wherein the first and second portions are angled with respect to one another,
   each arm comprising first and second receiving members for receiving a workpiece, the first and second receiving members being provided at first and second ends of each arm respectively,
   each arm being pivotably connected to the respective first and second support members at a point between the first and second ends of each arm, such that the workpiece may be supported by the first and second receiving members of the first arm and the first and second receiving members of the second arm,
   wherein the angle between the first and second portions is adjustable.

2. The workpiece support as claimed in claim 1, wherein the first and second arms or first and second receiving members are removable from the workpiece support.

3. The workpiece support as claimed in claim 2, wherein the first and second arms or first and second receiving members are interchangeable with alternative or replacement first and second arms or first and second receiving members.

4. The workpiece support as claimed in claim 1, wherein the workpiece support further comprises further arms with further first and second receiving members, and wherein the further arms are arranged such that there are arms either side of the support members.

5. The workpiece support as claimed in claim 1, wherein the first and second arms or first and second receiving members are adjustable in size or shape to accommodate different workpieces.

6. The workpiece support as claimed in claim 1, wherein the first or second arms are biased into a receiving position.

7. The workpiece support as claimed in claim 1, wherein the first and second receiving members are shaped to correspond with portions of the workpiece.

8. The workpiece support as claimed in claim 1, wherein the first and second receiving members comprise securing means for securing the receiving members to the workpiece.

9. The workpiece support as claimed in claim 1, wherein the first or second receiving members are fixed relative to the respective first or second arms.

10. The workpiece support as claimed in claim 1, wherein the first or second receiving members are pivotable relative to the respective first or second arms.

11. The workpiece support as claimed in claim 1, wherein the workpiece support further comprises one or more resilient means arranged to permit relative movement of the first and second receiving members.

12. The workpiece support as claimed in claim 1, wherein one or both of the first and second arms comprises three or more receiving members, the third and any further receiving members being provided at a point intermediate of the first and second ends of the first and second arms.

13. The workpiece support as claimed in claim 1, wherein the workpiece support is adapted to support workpieces of varying shapes or sizes.

14. The workpiece support as claimed in claim 1, wherein the workpiece support is adapted to support an engine.

15. The workpiece support as claimed in claim 1, wherein the workpiece support is adapted to support a gas turbine engine.

* * * * *